United States Patent [19]

Hannel

[11] Patent Number: 4,747,321

[45] Date of Patent: May 31, 1988

[54] ANTI-BACKLASH GEAR ASSEMBLY

[75] Inventor: Clifford L. Hannel, Los Angeles, Calif.

[73] Assignee: Lockheed Corporation, Calabasas, Calif.

[21] Appl. No.: 74,653

[22] Filed: Jul. 17, 1987

[51] Int. Cl.⁴ ............................................ F16H 55/18
[52] U.S. Cl. ........................................ 74/440; 74/409
[58] Field of Search .................................. 74/409, 440

[56] References Cited

U.S. PATENT DOCUMENTS

| | | | |
|---|---|---|---|
| 1,033,468 | 7/1912 | Raymond | 74/440 |
| 1,386,089 | 8/1921 | Butzen | 74/440 |
| 2,382,846 | 8/1945 | Barber | 74/306 |
| 2,679,167 | 5/1954 | Nichinson | 74/409 |
| 2,703,497 | 3/1955 | Townsend | 74/399 |
| 2,767,652 | 10/1956 | Dietrich et al. | 74/440 X |
| 2,880,625 | 4/1959 | Thomas | 74/440 |
| 3,035,454 | 5/1962 | Luning | 74/440 |
| 3,407,727 | 10/1968 | Fischer | 74/440 X |
| 3,803,936 | 4/1974 | Kroeper | 74/409 |
| 4,072,064 | 2/1978 | Lloyd | 74/409 |
| 4,305,307 | 12/1981 | Kiunke | 74/409 |
| 4,582,360 | 4/1986 | Becker | 297/362 |

FOREIGN PATENT DOCUMENTS 390314 11/1973 U.S.S.R. ............................ 74/440
1206532 1/1986 U.S.S.R. ............................ 74/440

Primary Examiner—Allan D. Herrmann
Attorney, Agent, or Firm—Louis L. Dachs

[57] ABSTRACT

The invention is an anti-backlash gear assembly. The gear assembly comprises first and second gears mounted on a common shaft and rotatable with respect to one another about the axis of rotation. The first gear has a slot. A fastener having a threaded end extends from the far side of the second gear into the slot. A cam member located within the slot incorporates a cam surface thereon and is threaded to the fastener. Thus, rotation of the cam member varies the distance of the cam surface to the walls of the slot. A cam follower is included having first and second ends with the first end in slideable contact with the cam surface. A Belleville spring washer is mounted between the second end of the cam follower and a side wall. Thus, the gear assembly can be easily engaged with a mating gear such as a rack gear, because the teeth of the first and second gears need not be biased apart. Once installed, the cam member can be rotated causing the cam surface to force the Belleville spring washer against the wall, causing the gears to rotate in opposite directions about the axis of rotation. Thus, the amount of rotation of the cam member determines the amount of loading of the gear teeth.

5 Claims, 3 Drawing Sheets

FIG. 1
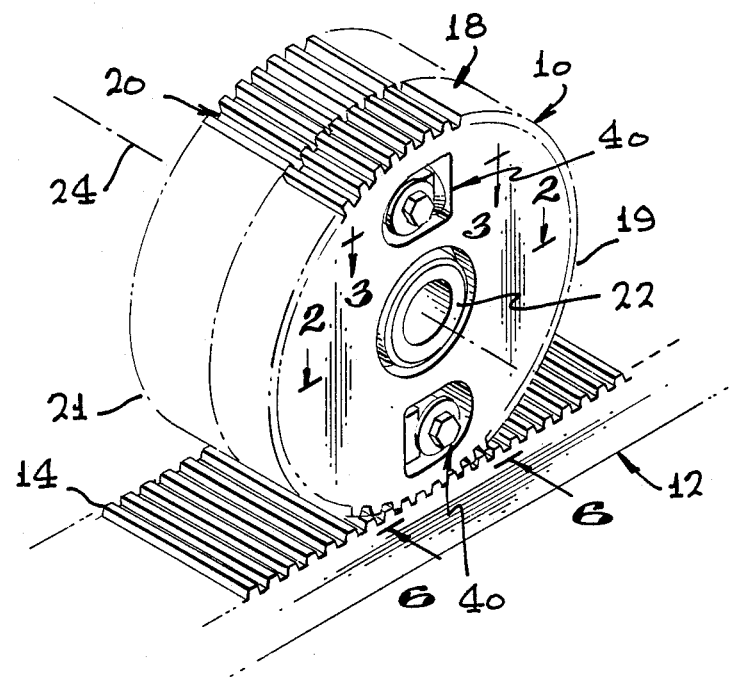
FIG. 2
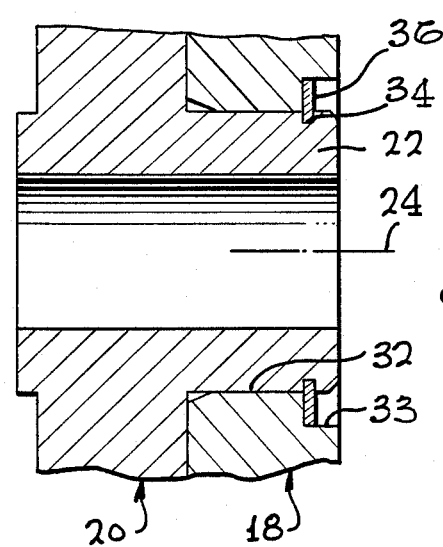
FIG. 5

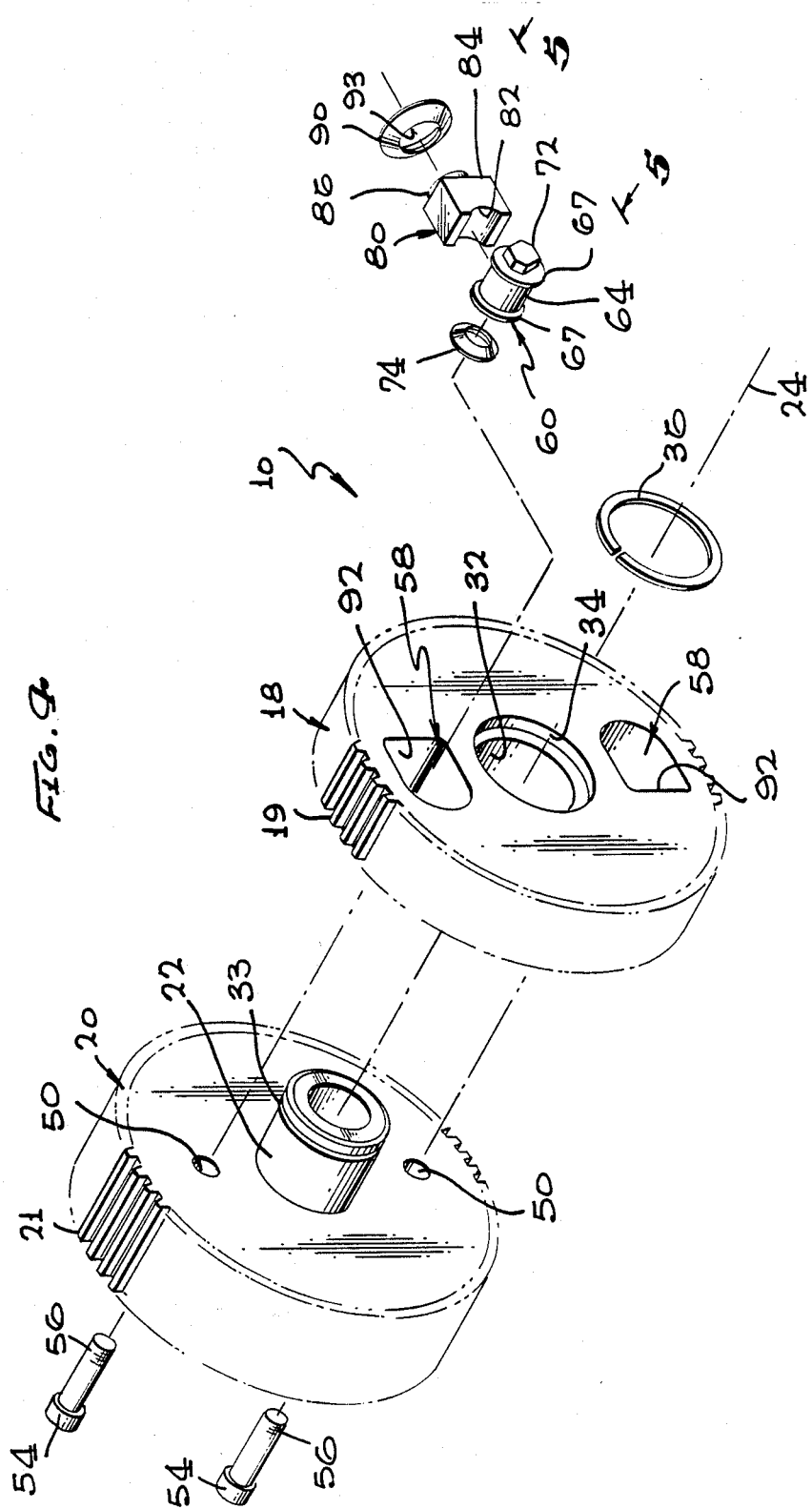

ANTI-BACKLASH GEAR ASSEMBLY

TECHNICAL FIELD

The invention relates to the field of anti-backlash gear assemblies and, in particular, to one that provides for the take-up of clearance between meshing gear teeth after installation.

BACKGROUND INFORMATION

It is necessary in mechanisms which require accuracy of operation, such as lathes, milling machines, indexing machines and numerous other machine tools, to provide some sort of anti-backlash mechanism in the gear train, so that repeatable positioning or indexing of the cutting tool is obtainable. Prior art methods typically use split gears with some sort of spring device to bias the gears in opposite rotational directions about a common shaft. One problem with such spring-loaded split gear configurations, is that the spring force must be overcome when installing the gear assembly i.e., engaging mating gears. This may be difficult to accomplish if the spring loads are large.

A more sophisticated approach can be found in U.S. Pat. No. 4,072,064 "Anti-Backlash Gear Assembly" by W. D. Lloyd. Here, the anti-backlash gear assembly includes a hydraulic cylinder that automatically maintains clearance filling positioning of two circumferentially and axially adjustable segments of a split gear. However, this device is complicated and expensive when compared to simple spring biasing systems. Furthermore, the cylinder may leak which could cause a loss of the anti-backlash feature.

Another approach can be found in U.S. Pat. No. 3,803,936 "Adjustable Herringbone Gears for use in Embossing, Engraving, and the Like" by B. Kroeper. This invention relates to a set of herringbone gears for use in a rotary embossing and engraving apparatus. One of the gears has three segments with an adjustable center segment in order to obtain positive contact between the teeth on the adjustable center segment and the teeth of the mating gear to prevent backlash and longitudinal side trust on the gears. A cam shaft is mounted in a hole extending through the center and side gear segments having a cam lobe located in the center segment. Rotation of the cam shaft causes the cam lobe to engage and position the center segment. With this system, once the prepositioning is accomplished by the cam, no variation is possible. Thus, if this type of anti-backlash gear assembly were mated with a rack gear which varied in distance from the center line of the gear assembly, slack or binding would appear as the gear traversed the rack gear causing a loss of the anti-backlash feature. Other patents of interest are U.S. Pat. No. 2,880,625 "Backlash Compensator" by A. G. Thomas, U.S. Pat. No. 4,582,360 "Hinge for Seat with Adjustable Backrest, Particularly Power Vehicle Seat" by P. Becker, U.S. Pat. No. 2,703,497 "Biasing Mounting" by V. G. Townsend, U.S. Pat. No. 2,679,167 "Antibacklash Device" by D. B. Nichinson, U.S. Pat. No. 4,305,307 "Anti-Backlash Gear Drive" by P. C. Kiunke, and U.S. Pat. No. 2,382,846 "Differential Gearing" by C. C. Barber.

Thus, while there are numerous anti-backlash gear assemblies available, none provide the combination of simple spring biasing means for relieving the biasing force for installing the anti-backlash gear assembly, means for automatically adjusting the amount of anti-backlash force on while in operation in one simple, reliable and inexpensive assembly.

Therefore, it is a primary object of the subject invention to provide an anti-backlash gear assembly of the split-gear type wherein the gears are spring biased apart.

It is another object of the subject invention to provide an anti-backlash gear assembly wherein the gear assembly is easily mated with other gears without the need for overcoming the anti-backlash biasing force.

It is a further obJect of the subject invention to provide an anti-backlash gear assembly wherein the amount of biasing force can be varied.

It is a still further object of the subject invention to provide an anti-backlash gear assembly wherein automatic dynamic adjustment is provided to compensate for tolerance build up and wear.

DISCLOSURE OF THE INVENTION

The invention is an anti-backlash gear assembly. The gear assembly comprises first and second gears mounted on a common shaft with the first gear rotatably mounted on the shaft and the second gear fixed thereto. Thus, the gears are rotatable with respect to one another about the axis of rotation. The first gear has a slot machined therethrough at a discrete distance from the axis of rotation. A cam means is rotatably mounted to the second gear, and includes a cam surface extending into the slot. Preferably, the cam means comprises a fastener having a threaded end which extends from the far side of the second gear into the slot. A cam member, having an eccentric cam surface thereon, has a threaded internal recess in engagement with the threaded end of the fastener. Thus, rotation of the cam member varies the distance of the cam surface to the side wall of the slot. The gear assembly further includes a cam follower having a first end in slideable contact with the cam surface. Biasing means, preferably in the form of a Belleville spring washer is mounted between the second surface of the cam follower and the side wall. The second end of the cam follower incorporates a protrusion which engages the center hole of the Belleville spring washer. Additionally, to aid in locking the cam member in place, a second Belleville spring is placed between the second gear and the cam member, thus loading the internal threads of the cam member against the threads of the fastener.

Thus, the gear assembly, with the cam surface rotated at right angles to the cam follower, can be easily placed into engagement with a mating gear such as a rack gear, because the teeth of the first and second gears will not be biased apart. Once installed, the cam member can be rotated causing the cam surface to displace the cam follower compressing the Belleville spring washer against the wall, and the gears to rotate in opposite directions about the axis of rotation. Thus, the amount of rotation of the cam member determines the amount of loading on the gear teeth.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

Illustrated in FIG. 1, is a perspective view of the anti-backlash gear assembly coupled to a rack gear.

Illustrated in FIG. 2, is an enlarged partial cross-sectional view, of the anti-backlash gear assembly shown in FIG. 1, taken along the line 2—2.

Figure 3:
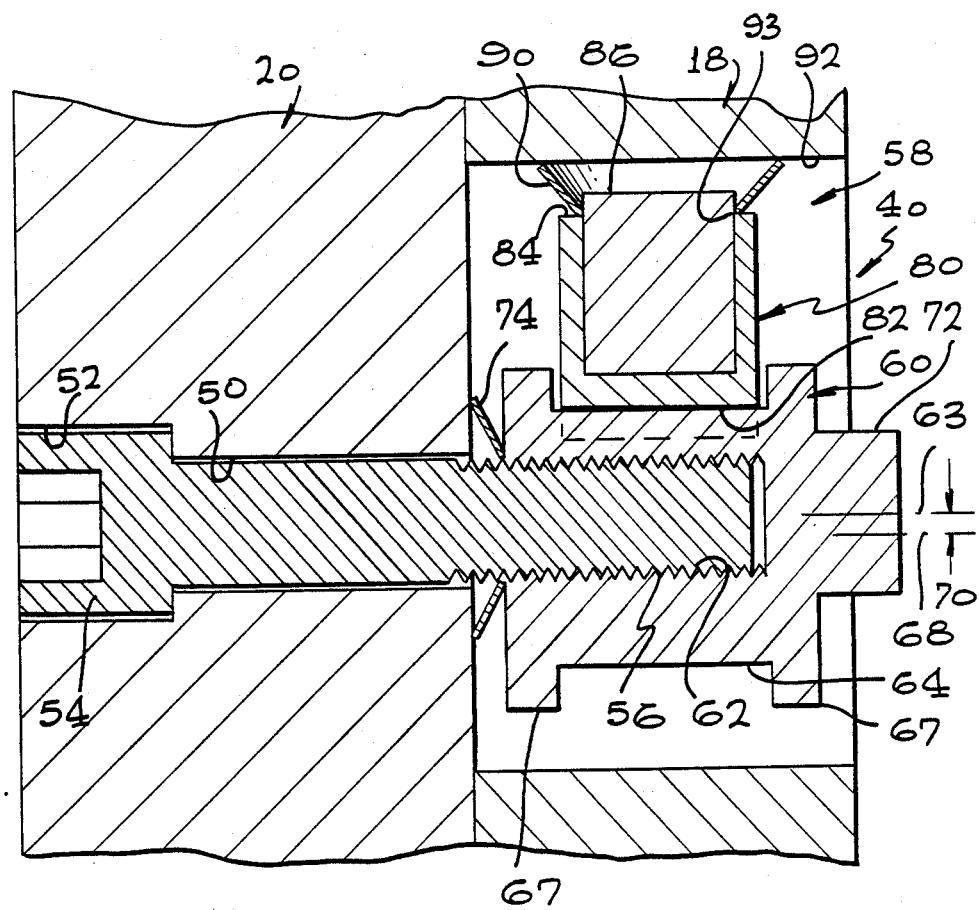

Illustrated in FIG. 3 is an enlarged partial cross-sectional view of the anti-backlash gear assembly shown in FIG. 1, taken along the line 3—3.

Illustrated in FIG. 4, is an exploded perspective view of the anti-backlash gear assembly shown in FIG. 1.

Illustrated in FIG. 5, is a cross-sectional view of a portion of the anti-backlash gear assembly illustrated in FIG. 4, taken along the line 5—5.

Figure 6:
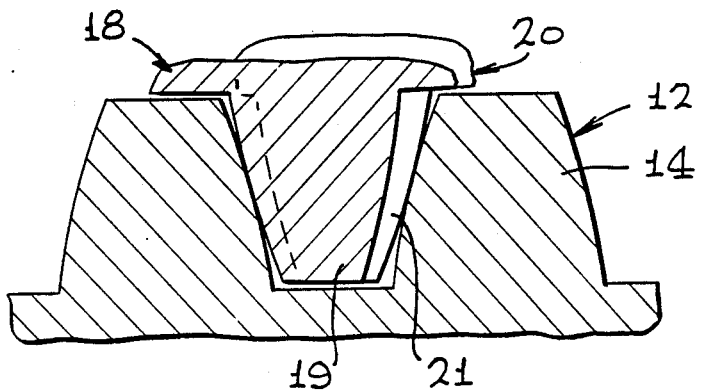

Illustrated in FIG. 6 is a partial cross-sectional view of the anti-backlash gear assembly shown in FIG. 1 taken along the line 6—6.

BEST MODE FOR CARRYING OUT THE INVENTION

Illustrated in FIG. 1 is a perspective view of the anti-backlash gear assembly in conjunction with a rack gear. Illustrated in FIG. 2 is a partial cross-sectional view of the anti-backlash gear assembly shown in FIG. 1 taken along the line 2—2 while illustrated in FIG. 4 is an exploded perspective view of the anti-backlash gear assembly illustrated in FIG. 1. Referring to FIGS. 1, 2 and 4 it can be seen that the anti-backlash gear assembly indicated by numeral 10, is typically coupled to other gears and, as illustrated in FIG. 1, a rack gear 12 having teeth 14. The gear assembly 10 basically comprises a first gear 18 having teeth 19 in engagement with the teeth 14 of the rack gear 12 and second gear 20 having teeth 21, also engaged with rack gear teeth. Gear 20 includes a shaft 22 having an axis of rotation 24. The gear 18 has an internal aperture 32 with a counterbore 33 for mounting the gear segment 18 to the gear 20. The shaft 22 includes a groove 34 which is aligned with the counterbore 33, such that the gear 18 can be locked to the gear 20 by means of snap ring 36. Thus, the gears 18 and 20 can rotate in relation to each other about the axis of rotation 24.

The gear assembly 10 incorporates two anti-backlash mechanisms 40. Referring to FIG. 3, which is a partial cross-sectional view of the gear assembly 10 illustrated in FIG. 1, taken along the line 3—3, wherein one of the anti-backlash gear mechanism 40 is illustrated in detail. The anti-backlash mechanism 40 comprises a hole 50 having a counterbore 52 in the gear 20. Mounted within the hole 50 is a fastener 54 having a threaded end 56 extending into a slot 58 in the gear 18. A cam member 60 includes internal threads 62 which engage the threaded end 56 of the fastener 54 with the centerline of the threads indicated by numeral 63. The cam member 60 has a cam surface 64 with guide walls 67 at each end and a center 68 offset from the centerline 63 by an offset distance indicated by numeral 70. The cam member 60 also incorporates a hex end 72 for engagement with a socket wrench (not shown) for turning the cam member 60. A Belleville spring washer 74 is mounted between the cam member 60 and the gear 20 to provide a loading of the threads of the fastener 54 and cam member to provide resistance to rotation therebetween.

The anti-backlash mechanism 40 further includes a cam follower 80 having a cam surface 82 in mating engagement with the cam surface 64 of the cam member 60. The guide walls 67 maintain the cam follower 80 in alignment with the cam surface 64. The opposite surface 84 of the cam follower 80 incorporates a protrusion 86 thereon. A Belleville spring washer 90 which biases the cam follower 80 away from the slot wall 92 is mounted on the protrusion 86 (the protrusion 86 extends into the center hole 93 of the washer 90).

Thus, it can be readily seen that the cam member 60 can be rotated to a position wherein the spring force from the Belleville spring washer 90 is eliminated and the gears 18 and 20 can be rotated so that the respective gear teeth 19 and 21 can be easily aligned. The gear assembly 10 can then be mated with the rack gear 12 with relative ease. Thereafter, the cam members 60 can be rotated to cause the gear teeth 19 and 21 to counter rotate about the axis 24 eliminating backlash between the rack gear teeth 14. This can be particularly seen in FIG. 6. Thus, the main features of the anti-backlash gear assembly are as follows:

1. Ease of assembly since gear teeth loading is accomplished after mating to other gears.
2. The load on the teeth can be varied.
3. A biasing load is applied so that misalignment or wear can be accommodated.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The anti-backlash gear assembly has application to all mechanisms wherein precise and repeated positioning of components is a necessity.

I claim:

1. An anti-backlash gear assembly comprising:
    a shaft;
    a first gear rotatably mounted to said shaft, said first gear having a slot therethrough;
    a second gear mounted to said shaft;
    a cam means rotatively mounted to said second gear having a cam surface extending into said slot;
    a cam follower having first and second ends, said first end in slideable contact with said cam surface and said second end in contact with said biasing means, and;
    biasing means coupled to said cam surface and one wall of said slot biasing said first and second gears in opposite angular directions about said axis of rotation.

2. The anti-backlash gear assembly as set forth in claim 1 wherein said cam means comprises:
    said second gear having a hole therethrough alignable with said slot;
    a fastener mounted in said hole having a threaded end extending into said slot; and
    said cam member having a threaded recess in engagement with said threaded end of said fastener, said cam member having said cam surface mounted thereon.

3. The anti-backlash gear assembly of claim 2, wherein:
    said biasing means is a Belleville spring washer; and
    said cam follower incorporates a protrusion extending through said Belleville spring washer.

4. The anti-backlash gear assembly of claim 3 further including means to releasably lock said cam member in a specific angular relationship to said fastener.

5. The anti-backlash gear assembly of claim 4, wherein said means to releasably lock is a second Belleville spring washer mounted between said second gear and said cam member, said fastener extending through said second Belleville spring washer.

* * * * *